US009944842B2

(12) United States Patent
Quintero et al.

(10) Patent No.: US 9,944,842 B2
(45) Date of Patent: Apr. 17, 2018

(54) METHODS OF PRE-FLUSHING RESERVOIR PATHS FOR HIGHER RETURN OF HYDROCARBON FLUIDS

(71) Applicant: BAKER HUGHES INCORPORATED, Houston, TX (US)

(72) Inventors: Lirio Quintero, Houston, TX (US); Steven Weghorn, Menomonie, WI (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 14/599,165

(22) Filed: Jan. 16, 2015

(65) Prior Publication Data

US 2015/0218920 A1    Aug. 6, 2015

Related U.S. Application Data

(60) Provisional application No. 61/936,086, filed on Feb. 5, 2014.

(51) Int. Cl.
*C09K 8/58* (2006.01)
*E21B 21/00* (2006.01)
*C09K 8/584* (2006.01)
*C09K 8/592* (2006.01)
*C09K 8/594* (2006.01)

(52) U.S. Cl.
CPC .............. *C09K 8/584* (2013.01); *C09K 8/592* (2013.01); *C09K 8/594* (2013.01); *E21B 21/00* (2013.01)

(58) Field of Classification Search
CPC . C09K 8/72; C09K 8/58; C09K 8/584; C09K 8/602; C09K 8/92; C09K 8/70; E21B 43/26; E21B 43/267; E21B 21/00
USPC ........................................................ 166/300
See application file for complete search history.

(56) References Cited

U.S. PATENT DOCUMENTS

| | | | |
|---|---|---|---|
| 3,208,515 A | 9/1965 | Meadors | |
| 3,373,809 A | 3/1968 | Cooke, Jr. | |
| 3,876,002 A | 4/1975 | Sarem | |
| 4,233,165 A * | 11/1980 | Salathiel | C09K 8/50 166/271 |
| 4,458,760 A * | 7/1984 | Hurd | C09K 8/584 166/269 |
| 6,284,714 B1 * | 9/2001 | Bland | C09K 8/26 507/100 |
| 6,302,209 B1 * | 10/2001 | Thompson, Sr. | B01F 17/0028 166/305.1 |
| 6,464,009 B2 * | 10/2002 | Bland | C09K 8/26 166/300 |
| 7,134,496 B2 | 11/2006 | Jones et al. | |
| 7,354,886 B2 * | 4/2008 | Bland | C09K 8/035 507/116 |
| 7,652,073 B2 | 1/2010 | Varadaraj | |
| 7,989,398 B2 * | 8/2011 | Bland | C09K 8/035 507/110 |
| 8,043,996 B2 * | 10/2011 | Harris | C09K 8/524 166/304 |
| 8,091,645 B2 * | 1/2012 | Quintero | C09K 8/32 166/278 |
| 8,091,646 B2 | 1/2012 | Quintero et al. | |
| 8,227,382 B2 * | 7/2012 | Dakin | C09K 8/52 166/311 |
| 9,068,108 B2 * | 6/2015 | Hill | C09K 8/68 |
| 9,200,192 B2 * | 12/2015 | Zelenev | C09K 8/602 |
| 9,222,013 B1 * | 12/2015 | Champagne | C09K 8/584 |
| 9,321,955 B2 * | 4/2016 | Hill | C09K 8/26 |
| 9,428,683 B2 * | 8/2016 | Hill | C09K 8/584 |
| 9,464,223 B2 * | 10/2016 | Champagne | C09K 8/602 |
| 2001/0049341 A1 * | 12/2001 | Bland | C09K 8/26 507/100 |
| 2003/0017951 A1 * | 1/2003 | Bland | C09K 8/26 507/200 |
| 2005/0107263 A1 * | 5/2005 | Bland | C09K 8/035 507/203 |
| 2008/0110618 A1 * | 5/2008 | Quintero | C09K 8/32 166/278 |
| 2008/0182763 A1 * | 7/2008 | Bland | C09K 8/035 507/218 |
| 2010/0152069 A1 * | 6/2010 | Harris | C09K 8/524 507/201 |
| 2010/0300967 A1 * | 12/2010 | Dakin | C09K 8/52 210/634 |
| 2012/0043086 A1 * | 2/2012 | Al-Mutairi | C09K 8/78 166/310 |
| 2013/0020085 A1 * | 1/2013 | Pone | C09K 8/584 166/305.1 |
| 2013/0133886 A1 * | 5/2013 | Quintero | C09K 8/52 166/279 |
| 2014/0284053 A1 * | 9/2014 | Germack | C09K 8/584 166/279 |
| 2014/0284057 A1 * | 9/2014 | Champagne | C09K 8/602 166/305.1 |
| 2014/0338911 A1 * | 11/2014 | Dismuke | C09K 8/035 166/300 |
| 2015/0068755 A1 * | 3/2015 | Hill | C09K 8/584 166/308.2 |
| 2015/0184061 A1 * | 7/2015 | Saboowala | C09K 8/52 166/305.1 |
| 2015/0329767 A1 * | 11/2015 | Vaughn | C09K 8/602 166/305.1 |
| 2016/0003018 A1 * | 1/2016 | Saboowala | C09K 8/035 166/298 |
| 2016/0032172 A1 * | 2/2016 | Pursley | C09K 8/588 166/305.1 |
| 2016/0102239 A1 * | 4/2016 | Pietrangeli | C09K 8/524 166/312 |

* cited by examiner

*Primary Examiner* — Zakiya W Bates
*Assistant Examiner* — Crystal J Miller
(74) *Attorney, Agent, or Firm* — Mossman, Kumar & Tyler, P.C.

(57) ABSTRACT

Pumping a pre-flush composition into a subterranean reservoir may contact at least a portion of non-polar material within a reservoir path. The pre-flush composition may have or include a polar fluid and at least one surfactant. The pre-flush composition may in situ form an in situ fluid in the reservoir path. The in situ formed fluid may include a portion of the non-polar material from the reservoir path, a polar phase from the polar fluid, and at least one surfactant. Pre-flushing the reservoir path may allow for greater hydrocarbon recovery when performing a subsequent operation as compared to an otherwise identical operation absent the pre-flushing the reservoir.

12 Claims, No Drawings

METHODS OF PRE-FLUSHING RESERVOIR PATHS FOR HIGHER RETURN OF HYDROCARBON FLUIDS

CROSS-REFERENCE TO RELATED APPLICATION

This application claims the benefit of Provisional Patent Application No. 61/936,089 filed Feb. 5, 2014, which is incorporated by reference herein in its entirety.

TECHNICAL FIELD

The present invention relates to pre-flushing a reservoir path to improve a subsequent enhanced oil recovery (EOR) and/or improved oil recovery (IOR) operation by pumping a pre-flush composition into a subterranean reservoir to contact non-polar material therein and form an in situ fluid comprising the non-polar material.

BACKGROUND

Enhanced oil recovery (EOR) and improved oil recovery (IOR) operations are sophisticated procedures that use viscous forces and/or interfacial forces to increase the hydrocarbon production, e.g. crude oil, from oil reservoirs. The EOR and/or IOR procedures may actually be initiated at any time after the primary productive life of an oil reservoir when the oil production begins to decline. The efficiency of EOR operations may depend on reservoir temperature, pressure, depth, net pay, permeability, residual oil and water saturations, porosity, fluid properties, such as oil API gravity and viscosity, and the like.

Primary methods of oil recovery use the natural energy of the reservoir to produce oil or gas. Primary methods do not require external fluids or heat as a driving energy. Secondary and tertiary oil recovery methods are used to inject materials into the reservoir that are not normally present in the reservoir, to produce additional oil or gas from the reservoir. Secondary and tertiary methods may be necessary when the primary recovery operation leaves behind a substantial quantity of hydrocarbons in the subterranean formation.

The secondary methods of oil recovery inject external fluids into the reservoir, such as water/and/or gas, to re-pressurize the reservoir and increase the oil displacement. Tertiary oil recovery includes the injection of special fluids, such as chemicals, miscible gases and/or thermal energy. The EOR operations follow the secondary operations and target the interplay of capillary and viscous forces within the reservoir. For example, in EOR operations, the energy for producing the remaining hydrocarbons from the subterranean formation may be supplied by the injection of fluids into the formation under pressure through one or more injection wells penetrating the formation, whereby the injection fluids drive the hydrocarbons to one or more producing wells penetrating the formation. EOR operations are typically performed by injecting the fluid through the injection well into the subterranean reservoir to restore formation pressure, improve oil displacement or fluid flow in the reservoir, and the like.

Suitable injection fluids include, among other things, water, steam, carbon dioxide, and natural gas. In particular, where the subterranean formation contains high permeability zones, the injection fluids may flow through the areas of least resistance, e.g., through the high permeability zones, thereby bypassing less permeable zones. While EOR operations may provide the energy necessary to produce hydrocarbons from the high permeability zones, hydrocarbons contained within less permeable zones may not be driven to production well(s) penetrating the formation.

Examples of secondary and tertiary oil recovery operations include water-based flooding and gas injection methods. Water-based flooding may also be termed 'chemical flooding' if chemicals are added to the water-based injection fluid. Water-based flooding may be or include, polymer flooding, ASP (alkali/surfactant/polymer) flooding, SP (surfactant/polymer) flooding, foam injection, low salinity water and microbial EOR; gas injection includes immiscible and miscible gas methods, such as carbon dioxide flooding, and the like. "Polymer flooding" comprises the addition of water-soluble polymers, such as polyacrylamide, to the injection fluid in order to increase the viscosity of the injection fluid to allow a better sweep efficiency by the injection fluid to displace hydrocarbons through the formation. The viscosified injection fluid may be less likely to by-pass the hydrocarbons and push the remaining hydrocarbons out of the formation.

Micellar, alkaline, soap-like substances, and the like may be used to reduce interfacial tension between oil and water in the reservoir and mobilize the oil present within the reservoir; whereas, polymers, such as polyacrylamide or polysaccharide may be employed to improve the mobility ratio and sweep efficiency, which is a measure of the effectiveness of an EOR and/or IOR operation that depends on the volume of the reservoir contacted by the injected fluid. The general procedure of a chemical flood may include a preflush (low-salinity water), a chemical solution (micellar or alkaline), a mobility buffer, and a driving fluid (water), which displaces the chemicals and the resulting oil back to production wells. The preflush composition and the mobility buffer are optional fluids.

When performing a polymer in solution flooding process, a polymer may increase the viscosity of the water to reduce the difference between the oil and the water-based flooding, so that less bypassing or channeling of the floodwater may occur. Said differently, the mobility of the floodwater may be decreased to provide a greater displacement of the flood front. Carbon dioxide ($CO_2$) injection is similar to water flooding, except that carbon dioxide is injected into an oil reservoir instead of water to increase the extraction of oil from the reservoir.

The alkaline/surfactant/polymer (ASP) technique may have a very low concentration of a surfactant to create a low interfacial tension between the trapped oil and the injection fluid/formation water. The alkali/surfactant/polymer present in the injection fluid may then be able to penetrate deeper into the formation and contact the trapped oil globules. The alkali may react with the acidic components of the crude oil to form additional surfactant in-situ to continuously provide ultra low interfacial tension and free the trapped oil. With the ASP technique, polymer may be used to increase the viscosity of the injection fluid, to minimize channeling, and provide mobility control.

It would be desirable to have better compositions and methods for improving the efficiency of an EOR operation.

SUMMARY

There is provided, in one form, a method for pre-flushing a reservoir path to improve a subsequent operation. The method may include pumping a pre-flush composition into a subterranean reservoir to contact at least a portion of non-polar material within the reservoir path. The pre-flush composition may include, but is not limited to, a polar fluid, and at least one surfactant. An in situ fluid may form in situ in the reservoir path having non-polar material, a polar material, and the surfactant(s).

In an alternative, non-limiting embodiment of the method, the pre-flush composition may be pumped through an injection well into the subterranean reservoir. After forming the in situ fluid, the method may further include performing an oil recovery operation, such as gas injection recovery method, water-based flooding, thermal recovery methods, and combinations thereof. The surfactant(s) used during the method may be or include non-ionic surfactants, anionic surfactants, cationic surfactants, amphoteric surfactants, extended surfactants containing a non-ionic spacer-arm central extension and an ionic or nonionic polar group, and mixtures thereof.

There is provided an alternative form of the method where the pre-flush composition may be a multiple phase composition. The multiple phase composition may include a polar phase, a non-polar phase, and at least one surfactant. The method may include breaking the multiple phase composition and contacting at least a portion of non-polar material in the reservoir path with the broken multiple phase composition. An in situ fluid may form in situ downhole where the in situ formed emulsion may include non-polar material from the reservoir path, a polar phase, and the surfactant(s).

The pre-flush fluid composition appears to alter non-polar material of a reservoir path to improve the efficiency of a subsequent operation.

DETAILED DESCRIPTION

It has been discovered that pumping a pre-flush composition into a reservoir path may enhance the hydrocarbon recovery of a subsequent operation. The pre-flush composition may take a particular path through the reservoir, hereinafter referred to as the reservoir path', and the pre-flush composition may contact at least a portion of non-polar material within the reservoir path to form an situ fluid therein. The pre-flush composition may alter the non-polar material within the reservoir path between an injection well and a production well by solubilizing, and/or removing non-polar material from the reservoir path. The in situ-formed fluid may include non-polar material from the reservoir path, a polar phase, and at least one surfactant. A subsequent operation would likely follow the same reservoir path created by the pre-flush composition and recover more hydrocarbon fluids from the subterranean reservoir as compared to an otherwise identical oil recovery operation absent the pre-flushing of the reservoir. 'Operation' as used herein includes secondary methods of oil recovery, tertiary methods of oil recovery, and combinations thereof, such as but not limited to IOR operations, EOR operations, and the like.

The pre-flush composition may be injected into the subterranean reservoir via an injection well to form in situ an in situ fluid in the reservoir path to incorporate non-polar and polar fluids and particles already present in the reservoir path. The in situ fluid may contact and solublize at least a portion of the non-polar material and polar material from the reservoir path to emulsify the non-polar material into the emulsion. The in situ fluid may be or include a nanoemulsion, a microemulsion, a miniemulsion, another type of emulsion, and combinations thereof.

An in situ fluid is one where the emulsion is formed within the reservoir path as opposed to being formed at the surface and pumped into the reservoir path. The pre-flush composition may be a solution pumped into the reservoir, and the components of the pre-flush composition subsequently form an in situ fluid in the reservoir path. Alternatively, the pre-flush composition may be an emulsion or multiple phase composition that is pumped into the reservoir path and in situ forms an in situ fluid that is different from the pumped pre-flush composition.

The contacting by the pre-flush composition may be accomplished by circulating the pre-flush composition within the injection well, by which is meant pumping the pre-flush fluid through substantially the whole active fluid system, including the borehole and all the surface tanks that constitute a primary system. That is, the pre-flush composition may be pumped into the reservoir path and allowed to soak the non-polar materials present, with the mixing of the non-polar material into the in situ fluid taking place by diffusion.

The non-polar materials may be altered by a method, such as but not limited to, removing the non-polar material, changing the wettability of the non-polar material from oil-wet to water-wet, or otherwise remediating the non-polar material prior to the operation, and combinations thereof. Such non-polar materials may be or include, but are not limited to, residual solids of oil-based mud; residual solids of synthetic-based mud; deposits from crude oil, such as paraffins, asphaltenes, slugs; and combinations thereof. Slugs are extremely high viscous fluids that have combined with solids and form when a crude oil or an oil-based mud (OBM) contacts an aqueous fluid having additives for targeting emulsification and/or trapped solids. 'Non-polar material' is defined herein to be any non-polar material in the reservoir path capable of being altered; the non-polar material may be solid particles, liquid droplets, and mixtures thereof. Non-limiting examples of liquid droplets may be or include hydrocarbons, such as crude oil that may be located in the reservoir path.

It will be appreciated that it is not necessary for all of the non-polar materials to be solubilized and/or removed from a reservoir path for the method and its compositions herein to be considered successful. Success is obtained if more non-polar materials are altered using the pre-flush fluid composition as compared to an otherwise identical reservoir path absent the pre-flush composition. Alternatively, the methods and compositions are considered successful if at least a portion of the non-polar materials is altered. In one non-limiting embodiment at least a majority (>50%) of the non-polar materials are altered. In general, of course, it is desirable to alter as much of the non-polar materials, contaminants and other oil-wet particulates as possible. One non-restrictive goal of the methods and compositions herein is to alter non-polar material to obtain a higher return of hydrocarbon fluids after the performance of a subsequent operation.

Altering the non-polar material may be accomplished by changing the surface wettability of oil-wet non-polar material and/or incorporating the non-polar material into an in situ fluid, such as a Winsor III microemulsion and/or single phase microemulsion, such as Winsor IV or similar chemistry, as will be described later in more detail. With the conversion of the external nonpolar material to internal emulsified material in water, most of the non-polar material and particulate material is either removed or micro-sized to the extent that only a minimal or reduced amount of non-polar components remain in the reservoir path.

It will be appreciated that the amount of in situ fluid to be created or formed and the amounts of in situ-forming components (polar, nonpolar, a surfactant, and optional additives) to be added or included are difficult to determine and predict in advance or in general with much accuracy since it is dependent upon a number of interrelated factors including, but not necessarily limited to, the brine type, the type of non-polar materials, the temperature of the reservoir path, the particular surfactant or surfactant blend used, whether a chelating agent, alkali agent or acid is present and what type, etc. Nevertheless, in order to give some idea of the quantities used, in one non-limiting embodiment, the amount of non-polar material incorporated into the in situ fluid may range from about 1 wt % independently to about 90 wt %, or from about 1 wt % independently to about 50 wt % in another non-limiting embodiment. As used herein with respect to a range, "independently" means that any lower threshold may be used together with any upper threshold to give a suitable alternative range. Once the non-polar material is altered, the effective permeability of the subterranean reservoir increases, and the subsequent operation may recover more hydrocarbon fluids as compared to an otherwise identical operation absent the pre-flushing composition. The forming of in situ fluid and other uses for them are also described in U.S. Pat. Nos. 8,091,646; 8,091,645; and 7,134,496; all of which are herein incorporated by reference in their entirety.

The pre-flush composition may include, but is not limited to, a polar fluid and at least one surfactant. In one non-limiting embodiment herein, the pre-flush composition may contain a non-polar liquid, such as a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as Escaid 110 (from Exxon) or ECD 99-DW oils (from TOTAL) may also be used as a non-polar liquid in preparing the pre-flush composition. Other suitable non-polar liquids include, but are not necessarily limited to, limonene, pinene and other terpenes, xylene, mutual solvents, and the like. An advantage of forming the in situ fluid is that less non-polar liquid needs to be used (as compared to a pre-formed nanoemulsion, miniemulsion or microemulsion) since all or most of the non-polar liquid is found in the non-polar materials. This gives a higher capacity for the in situ fluid to solubilize the oil and other substances of the non-polar materials.

The pre-flush composition does not require any additional oil or solvent in the formulation, or at least much less than the proportion that could be solubilized in the final in situ fluid, which gives a higher capacity for oil or non-polar material incorporation or cleaning capability when contacting the non-polar material in the reservoir path. Any oil-wet particles or oil-wet contamination turn from oil-wet to water-wet. Additionally, water-wetting improves damage remediation when mineral acids, organic acids, oxidizing agents, water-soluble enzymes (e.g. catalysts), or precursors of these components (e.g. in situ acid generators) are spotted into a subterranean reservoir after or during the wettability reversal process, because it favors the contact between the acid and the particles.

The polar fluid may be or include, but is not limited to a water-based fluid, an alcohol-based fluid, a glycol-based fluid, a brine-based fluid, a reused water-based fluid, and combinations thereof. The reused water may have been separated from a crude oil previously produced in a non-limiting embodiment. Any of the commonly used chloride brines, and salts to make them, are expected to be suitable in the compositions and methods herein. In another non-limiting embodiment, the salts suitable for use in creating the brine include, but are not necessarily limited to, ammonium chloride, sodium chloride, potassium chloride, and combinations thereof.

The surfactant(s) may be present in the pre-flush composition in an amount ranging from about 0.01 vol % independently to about 10 vol %, or from about 0.1 vol % independently to about 5 vol %. The surfactant(s) may be or include, but is not limited to, non-ionic surfactants, anionic surfactants, cationic surfactants, amphoteric surfactants, zwitterionic surfactants, extended surfactants containing a non-ionic spacer-arm central extension and an ionic or nonionic polar group, and mixtures thereof.

The nonionic surfactants may be or include, but are not limited to, alkyl polyglycosides, sorbitan esters, methyl glucoside esters, polyglycol esters, alcohol ethoxylates, and mixtures thereof. The anionic surfactants may be or include, but are not limited to, alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates, and mixtures thereof. The cationic surfactants may be or include, but are not limited to, arginine methyl esters, alkanolamines, and alkylenediamides, extended surfactants with propoxylated or ethoxylated spacer arms, and mixtures thereof.

A water solution of surfactant already containing some solubilized oil (in a non-restrictive example only from about 1 to about 40% or so) may be pumped into the reservoir path to form the in situ fluid. In other words, the water solution may be considered as an emulsion containing only 1% of oil. Once in the reservoir path, this fluid will solubilize the non-polar material in situ to become an in situ fluid containing much more oil, in a non-limiting instance, up to about 70 or 80%. The in situ fluid is different from the water solution within the pre-flush composition that may be pumped into the reservoir.

In a non-limiting embodiment, the pre-flush composition may be a multiple phase composition pumped into the subterranean reservoir to contact at least a portion of non-polar material within the reservoir path. A multiple phase composition may be an emulsion within an emulsion. The multiple phase composition may include the polar fluid, the surfactant(s), and the optional additional additives mentioned above. The multiple phase composition may have at least three phases, and four phases in a non-limiting embodiment. The multiple phase composition may be broken to release the surfactant(s) and any optional additional additives.

The surfactant(s) and optional additional component(s) may be part of an inner phase of the multiple phase composition, which may ensure delivery of the surfactant(s) and optional additional component(s) to the reservoir path. The surfactant(s) and optional additional additives of the broken multiple phase composition may contact at least a portion of non-polar material in the reservoir path and in situ form an in situ fluid in the reservoir path. The in situ-formed emulsion may include a portion of non-polar material, a polar phase from the polar fluid, and the surfactant(s).

In a non-limiting embodiment, the fluid composition may also include an additional component, such as but not limited to, a solvent, a co-surfactant, a co-solvent, an organic acid, an inorganic acid, an alkali agent, a surfactant having a liphophilic linker, a surfactant having a hydrophilic linker, and combinations thereof. The co-surfactant may be or include, but is not limited to, alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof. Suitable co-surfactants include, but are not necessarily limited to, mono or poly-alcohols, low molecular weight organic acids or amines, polyethylene glycol, low ethoxylation solvents such as butoxyethanol and the like, and mixtures thereof. If the additional component is a surfactant or co-surfactant, the additional component is different from the at least one surfactant already noted or present in the pre-flush composition.

In another non-restrictive embodiment, the co-surfactant may be an alcohol having from about 3 independently to about 10 carbon atoms, alternatively from about 4 independently to about 6 carbon atoms, such as butanol. In one non-restrictive embodiment the number of ethoxy units of the co-surfactant may range from about 3 independently to about 15, alternatively from about 6 independently to about 10. The optional co-surfactant(s) from the pre-flush composition may be incorporated into the in situ fluid.

The proportion of optional co-surfactant to be used with the surfactant is difficult to specify in advance and may be influenced by a number of interrelated factors including, but not necessarily limited to, the nature of the surfactant, the nature of the co-surfactant, the type of non-polar materials being removed, displaced or otherwise affected, reservoir conditions, and the like. In one non-limiting embodiment, a pre-flush composition may have a surfactant blend of polyethoxylated alkyl sulfate and polyglycerol ester (such as PG 8-10 ester available from Oleon N. V.) that has a molar ratio of free OH/esterified OH of 3.4/1, optionally with an alkyl alcohol ethoxylated with 7.5 or higher EO.

The pre-flush may also contain a buffer to activate natural surfactants. The pre-flush composition may also contain acids, chelating agents, or other precursor additives that can dissolve acid-soluble particles. Alcohols are substances of intermediate polarity; that is, intermediate between non-polar substances, such as oils, and polar substances such as water. In one non-limiting embodiment, the in situ-formed emulsion may form using a surfactant, a polar fluid, and a relatively small amount of non-polar fluid and/or fluid of intermediate polarity.

The chelating agent may solubilize the non-polar particles that may be present, such as calcium carbonate, hematite, ilmenite, and barite. PACAs may perform relatively better in an alkaline environment as the salt of these acids, which further differentiates them from the more common acids and salts thereof. For instance a salt of PACA dissociates barium sulfate from the calcium carbonate treated; the PACA takes on the cation. In a non-limiting example, a Na or K salt of PACA when contacting calcium carbonate contacts and dissolves the barium salt through cation exchange. However, the undissociated acid form still performs the functions and achieves the desired results of the methods and compositions herein. The plain acid form works somewhat better at relatively low pH.

In non-limiting embodiments, the chelating agent may be polylactic acid and/or a polyamino carboxylic acid (PACA) of the acrylic or maleic type, or carboxylated polysaccharides, or a salt of PACA. Suitable PACAs and other chelating agents include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetramine hexaacetic acid (TTNA), trans-1,2-diaminocyclohexane tetraacetic acid (DCTA), tripolyphosphates, polyphosphates, pyrophosphates, alpha-ether carboxylates, oxy-diacetate salts, carboxymethyl tartronate (CMT) and carboxymethyl oxy-succinate (CMOS), citric, tartaric and tartronic salts, and mixtures thereof.

The chelating agent may solubilize or dissolve at least some of the particulate present. The chelating agent may be one or more inorganic acids or salts thereof including, but not necessarily limited to, hydrochloric acid, sulfuric acid, and/or organic acids including, but not necessarily limited to, an organic agent or salt thereof, e.g. acetic acid, formic acid and mixtures thereof. In one non-limiting embodiment, the acid may be only one mineral acid or only one organic acid. The concentration of the chelating agent in the preflush composition may range from about 0.1 vol % independently to about 30 vol %, or from about 1 vol % independently to about 10 vol % in another non-limiting embodiment.

There are various ways by which the chelating agent may be delivered according to the procedure herein. The chelating agent may be added to the pre-flush composition prior to pumping the pre-flush composition into the reservoir, added before (as a presoak) the pre-flush composition, added after the pre-flush composition is pumped, and combinations thereof. Alternatively, the chelating agent may be added to the in situ fluid once it has formed in place before removing the majority of the non-polar materials and combinations thereof.

The pre-flush composition may form an emulsion in situ in the reservoir path where the in situ-formed emulsion comprises a portion of non-polar material from the reservoir path, a polar phase from the polar fluid, and the surfactant(s). The in situ fluid may be or include, but is not limited to, a miniemulsion, a nanoemulsion, a single-phase microemulsion, and combinations thereof. When the additional component(s) is included in the pre-flush composition, some or all of the additional component(s) may be included in the in situ formed emulsion.

A nanoemulsion may be defined as a type of emulsion having a dispersed/discontinuous phase of a mean droplet size less than about 1000 nm; the components of the continuous and dispersed/discontinuous phases must be immiscible enough to allow for the respective phase formation. Some nanoemulsions may have a smaller range for mean droplet size specified, and it is possible to have more than one dispersed/discontinuous phase. These emulsions are typically composed of a nonpolar phase (usually denoted as the oil phase), a polar phase (typically aqueous and denoted as the aqueous or water phase), a surfactant, and optionally one or more additional components. There may be a narrow droplet size distribution depending on the preparation process.

A miniemulsion may form by having two immiscible liquid phases mixed together, such as a surfactant and a co-surfactant, via high shear mixing. Droplets of about 50 nm to about 500 nm may form. A miniemulsion has an inner phase that may act as an emulsifier, such that the inner state disperses into nano-size droplets within the outer phase. Miniemulsions may form spontaneously.

Microemulsions are thermodynamically stable, macroscopically homogeneous mixtures of at least three components: a polar phase and a nonpolar phase, and at least one surfactant. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Gat, "Chapter 7: Aggregation Behavior in One-Phase (Winsor IV) Microemulsion Systems", in P. Kumar and K. L. Mittal, ed., Handbook of Microemulsion Science and Technology, Marcel Dekker, Inc., New York, 1999, pp. 185-246.

The referenced chapters describe the types of microemulsion phase behavior defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the in situ fluid formed in the methods and compositions herein are of the Winsor IV type, which means the entire system is a microemulsion phase at least at first and somewhere in the process, with the possibility of ending with one or two excess phases as the injected formulation is diluted by the reservoir fluids. That is, the original single phase microemulsion may change phase and become a Winsor III microemulsion system. The thermodynamically stable single phase Winsor IV microemulsion could evolve by a change in formulation or composition into the formulation of a miniemulsion or nanoemulsion, which is a two-phase system either Winsor I or Winsor II with submicron size droplets which could be stable for a long period of time, but not permanently stable as a microemulsion, as explained in reference J. L. Salager, "Emulsion Phase Inversion Phenomena" in Emulsions and Emulsion Stability, J. Sjoblom Ed., 2nd Edition, Chap. 4, pp. 185-226, Taylor and Francis, London (2006).

Single-phase microemulsions may be defined as bi-continuous phases formed by oil and water. In one non-limiting explanation of the phenomenon, a single phase microemulsion contacts the oil-based mud and other non-polar materials and forms a water continuous (oil-in-water) microemulsion.

The method may further include performing an operation after the in situ fluid has formed and altered (e.g. incorporated) the non-polar material. The operation may be or include, but is not limited to, water-based flooding and gas injection recovery method. Non-limiting examples of water-based flooding/chemical flooding may be or include polymer flooding, ASP flooding, SP flooding, microbial flooding, low-salinity flooding and the like. Gas injection methods may be or include miscible flooding and immiscible flooding, such as carbon dioxide flooding. Thermal methods may include hot water or steam injection or in situ combustion. The operation may have an improved efficiency and/or increased hydrocarbon recovery as compared to an otherwise identical operation absent the pre-flush composition because there is a reduced amount of non-mobile non-polar material impeding the reservoir path.

In the foregoing specification, the invention has been described with reference to specific embodiments thereof, and has been described as effective in providing methods for pre-flushing a reservoir path to improve a subsequent operation. However, it will be evident that various modifications and changes can be made thereto without departing from the broader spirit or scope of the invention as set forth in the appended claims. Accordingly, the specification is to be regarded in an illustrative rather than a restrictive sense. For example, specific polar fluids, surfactants, additional components, and operations falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method for pre-flushing reservoir path to improve a subsequent enhanced oil recovery (EOR) and/or IOR operation may consist of or consist essentially of pumping a pre-flush composition into a subterranean reservoir having a polar fluid and at least one surfactant where the pre-flush composition in situ forms an in situ fluid in the reservoir path having non-polar material, a polar phase from the polar fluid, and the surfactant(s); the in situ fluid may contact at least a portion of non-polar material within the reservoir path.

The words "comprising" and "comprises" as used throughout the claims, are to be interpreted to mean "including but not limited to" and "includes but not limited to", respectively.

What is claimed is:

1. A method of pre-flushing a subterranean reservoir path to improve a subsequent operation; wherein the operation is a secondary operation, a tertiary operation, and combinations thereof; wherein the method comprises:
    pumping a multiple phase composition through an injection well into a subterranean reservoir to contact at least a portion of non-polar material within the subterranean reservoir path; wherein the multiple phase composition comprises a polar phase, a non-polar phase, and at least one surfactant, and the multiple phase composition is an emulsion within an emulsion;
    breaking the multiple phase composition;
    contacting at least a portion of non-polar material in the subterranean reservoir path with the broken multiple phase composition; and
    in situ forming an in situ fluid downhole, wherein the in situ formed fluid comprises a portion of non-polar material from the subterranean reservoir path, a polar phase, and the at least one surfactant;
where the subterranean reservoir path is between the injection well and a production well.

2. The method of claim 1, wherein the multiple phase composition further comprises an additional component selected from the group consisting of a solvent, a co-surfactant, a co-solvent, an organic acid, an inorganic acid, a surfactant having a liphophilic linker, a surfactant having a hydrophilic linker, a chelating agent, and combinations thereof.

3. The method of claim 2, wherein the co-surfactant is selected from the group consisting of alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof.

4. The method of claim 1, further comprising performing the operation after forming the in situ fluid downhole, wherein the operation is selected from the group consisting of water-based flooding, gas injection method, thermal recovery methods, and combinations thereof.

5. The method of claim 4, further comprising recovering more hydrocarbon fluids from the subterranean reservoir as compared to an otherwise identical operation absent the pre-flushing the subterranean reservoir path.

6. The method of claim 4, further comprising recovering more hydrocarbon fluids from the subterranean reservoir as compared to an otherwise identical operation absent the pre-flushing the subterranean reservoir path.

7. The method of claim 1, wherein the at least one surfactant is present in the multiple phase composition in an amount ranging from about 0.01 vol % to about 10 vol %.

8. The method of claim 1, wherein the in situ fluid is selected from the group consisting of a miniemulsion, a nanoemulsion, a single-phase microemulsion, a Winsor III microemulsion, and combinations thereof.

9. A method of pre-flushing a subterranean reservoir path to improve a subsequent operation; wherein the operation is a secondary operation, a tertiary operation, and combinations thereof; wherein the method comprises:
  pumping a multiple phase composition through an injection well into a subterranean reservoir to contact at least a portion of non-polar material within the subterranean reservoir path; wherein the multiple phase composition comprises a polar phase, a non-polar phase, and at least one surfactant, and the multiple phase composition is an emulsion within an emulsion, wherein the at least one surfactant is present in the multiple phase composition in an amount ranging from about 0.01 vol % to about 10 vol %;
  breaking the multiple phase composition;
  contacting at least a portion of non-polar material in the subterranean reservoir path with the broken multiple phase composition; and
  in situ forming an in situ fluid downhole, wherein the in situ formed fluid comprises a portion of non-polar material from the subterranean reservoir path, a polar phase, and the at least one surfactant;
  where the subterranean reservoir path is between the injection well and a production well; and
  performing the operation after forming the in situ fluid downhole, wherein the operation is selected from the group consisting of water-based flooding, gas injection method, thermal recovery methods, and combinations thereof.

10. The method of claim 9, wherein the multiple phase composition further comprises an additional component selected from the group consisting of a solvent, a co-surfactant, a co-solvent, an organic acid, an inorganic acid, a surfactant having a liphophilic linker, a surfactant having a hydrophilic linker, a chelating agent, and combinations thereof.

11. The method of claim 9, wherein the co-surfactant is selected from the group consisting of alcohols, glycols, ethoxylated alcohols, ethoxylated glycols, ethoxylated phenols, propoxylated alcohols, propoxylated glycols, propoxylated phenols, ethoxylated and propoxylated alcohols, ethoxylated and propoxylated glycols, ethoxylated and propoxylated phenols, and combinations thereof.

12. The method of claim 9, wherein the in situ fluid is selected from the group consisting of a miniemulsion, a nanoemulsion, a single-phase microemulsion, a Winsor III microemulsion, and combinations thereof.

* * * * *